United States Patent [19]
McCormick

[11] 4,001,542
[45] Jan. 4, 1977

[54] METHOD AND APPARATUS FOR FORMING A STREAM FEEDER

[75] Inventor: Ronald O. McCormick, Columbus, Ohio

[73] Assignee: Owens-Corning Fiberglas Corporation, Toledo, Ohio

[22] Filed: June 13, 1975

[21] Appl. No.: 586,837

[52] U.S. Cl. .............................. 219/117 R; 29/432; 29/432.1; 72/335; 219/103; 219/107

[51] Int. Cl.² ......................................... B23K 11/00

[58] Field of Search ............ 29/432, 432.1; 72/335; 83/623; 219/103, 107, 117

[56] References Cited
UNITED STATES PATENTS

| | | | |
|---|---|---|---|
| 2,176,846 | 10/1939 | Werme | 29/432 X |
| 2,933,590 | 4/1960 | Leedy et al. | 219/117 R X |
| 3,276,499 | 10/1966 | Reusser | 29/432 X |
| 3,777,601 | 12/1973 | Strandell | 83/623 X |

Primary Examiner—J. V. Truhe
Assistant Examiner—N. D. Herkamp
Attorney, Agent, or Firm—John W. Overman; Ronald C. Hudgens; Kenneth H. Wetmore

[57] ABSTRACT

A method of and apparatus for fabricating an orificed wall for a feeder for flowing streams of filament forming material such as molten glass by punching an aperture through a plate from one side to the other and then permanently depressing the plate immediately adjacent the aperture at the other side to such an extent that any tendency to bow from the aperture forming operation is essentially negated.

18 Claims, 9 Drawing Figures

METHOD AND APPARATUS FOR FORMING A STREAM FEEDER

BACKGROUND OF THE INVENTION

When producing synthetic fibers or filaments and particularly synthetic continuous filaments usable for textiles from heat softened mineral material such as molten glass or the like, it is conventional practice to use a stream feeding container or bushing, normally made of platinum alloy, having a bottom wall with a plurality of orifices through which pass streams of the heat softened mineral material. Suitable apparatus attentuates the streams into continuous fibers or filaments. Further, it has been a practice to fashion the bottom wall of the feeder of the stream feeding container with orificed projections.

Heretofore there has been available only a few practical ways for producing the orificed wall of stream feeding containers and orificed projections that are normally a constituent of such feeders, especially feeders for feeding streams of molten glass. In one practice the orificed wall of the stream feeding container, normally made of a platinum alloy, is fashioned with projections from raised portions that may be built-up on the plate by flame-fusing drops of globules of platinum alloys at spaced regions on the plate. Subsequent coining or chaping of the raised portions provides projections of desired shape. Thereafter, suitable means such as drilling opens a passageway through each of the heretofore solid base plate and projections to provide a passageway opening through the base plate and extending longitudinally of the projections through which heat softened material may flow. Further, it has been another practice to manufacture feeders or tip sections by securing flanged tubular eyelet-like members in registry with openings in a base plate by welding the flanges to the plate.

The prior art methods and apparatus for producing stream feeders are inadequate and slow. When the orificed projections are made by first forming raised portions on a plate, the formation of such raised portions and subsequent passageway formation, e.g. by drilling, is exceedingly slow. Moreover, when the process includes drilling the passageways, the passageways of the individual orificed projections are non-uniform. "Drill drift" contributes significantly to the non-uniformity between orifice projections by making passageways that do not run axially of the projections. Additionally, apparatus tends to lack the accuracy for on center drilling, thereby producing orificed projections having axially extending passageways laterally offset varying amounts. Then too, drills tend to produce passageways having differing passageway surface characteristics, which promotes non-uniformity among individual fibers produced from the stream feeding container.

The deficiencies of the prior art have become more acute under modern filament forming conditions where the size and character of the passageways of the projections have become more critical and the number of orificed projections have often increased to 2,000 or more on feeders used for producing glass filaments. Moreover, uniformity of filament diameter is of considerable competitive concern wherein all filaments, e.g. glass filaments, within a bundle require a high degree of uniformity.

The processes using tubular eyelets, while providing some advance in the art, are severely limited. For example, drilling the holes in the plate into which the tubular members are inserted is an extremely slow process. While such holes may be punched much faster, the fact that the plate will bow due to the stresses set up within the plate inherent in the punching operation requires that the plate be straightened before proceeding with subsequent fabrication operations. Furthermore, the plate will expand across its length and width as the holes are punched thereby distorting the relative location of the holes even more. In addition due to the close spacing of the holes as successive holes are punched the shape of the previously punched holes will change. All of these effects require straightening of the plate and they also require the tubular members be manually inserted or that special equipment be used to locate the true position of the hole before the tubular members can be inserted automatically.

SUMMARY OF THE INVENTION

An object of present invention is an improved orificed wall for flowing streams of filament forming material such as glass.

Another object of the invention is the provision of an apparatus and method for producing an orificed wall wherein the plate remains essentially flat.

Another object of the invention is the provision of an apparatus and method of producing an orificed wall wherein the apertures are formed and members inserted quickly and efficiently.

The above and other objects are attained by the method of and apparatus for forming an aperture from a first major surface side of the plate to the second major surface side, and depressing the plate immediately adjacent to the aperture at the second side toward the first side to such an extent that any tendency of the plate to bow from the aperture forming operation is essentially negated.

DESCRIPTION OF THE PREFERRED EMBODIMENTS

While the invention has particular utility in the production of a bottom wall for stream feeding containers formed of platinum or an alloy of platinum wherein orificed projections or members with passageways for flowing streams of heat softened material such as glass from the container, the invention may be employed wherever one requires the production of essentially flat bottom walls for stream feeding containers.

Figure 1:
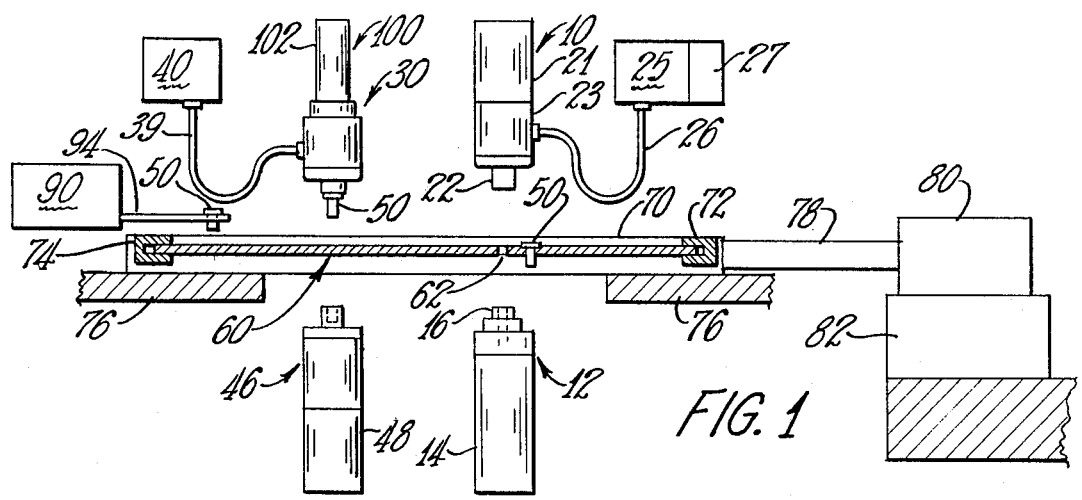
FIG. 1 is a front elevation of apparatus having two stations, one for punching the aperture and one for inserting the eyelet according to the principles of the invention.

FIG. 1 illustrates a two station apparatus according to the principles of the invention, a punch station 10 and an eyelet insertion station 30, for indiviudally punching an aperture in a plate from one direction and inserting from the other each eyelet 50 into the punched aperture in the plate 60.

Plate 60, normally composed of a suitable platinum alloy, is fastened to the fixture 70 by means of one rigid clamp 72 and a suitable number of secondary clamps 74, depending upon the size of the plate 60. The rigid clamp 72 solidly fastens one corner of plate 60 to fixture 70; resisting movement of plate 60 with respect to fixture 70 in any direction. Usually the rigid clamp 72 is located nearest to the selected starting point for installation of the eyelets 50, which are also composed of a suitable platinum alloy. Each secondary clamp 74 resists relative movement between plate 60 and fixture 70 in the vertical direction and not in the horizontal plane, by resiliently mounting each secondary clamp 74 to fixture 70. As the plate 60 is worked (i.e., apertures punched and eyelets inserted) it will have a tendency to expand along its length and width, and if rigidly restrained around its periphery the plate 60 will have a tendency to buckle. With the plate 60 fastened to fixture 70 as stated above, plate 60 will be allowed to expand along its length and width away from the point on plate 60 which is solidly fastened to fixture 70 by means of rigid clamp 72, thus reducing the tendency to buckle and facilitating automatic operation.

Fixture 70 slidably engages support 76 at both lateral ends of the fixture 70; with one end of arm 78 also fastened to fixture 70. The other end of arm 78 is connected to a suitable uniaxial traversing means 80 such as hydraulic powered "Flo-Tork" crank arm rapid traverse slide assembly to produce a rapid reciprocating motion between the punch station 10 and eyelet insertion station 30 for the selected points on plate 60.

The uniaxial traversing means 80 is affixed to a suitable numerically controlled table (N/C table) 82, which provides x and y axial motions in the horizontal plane to position each successive aperture location in the pattern by shifting the uniaxial traversing means 80 which through arm 78 shifts fixture 70 and thus plate 60.

Figure 2:
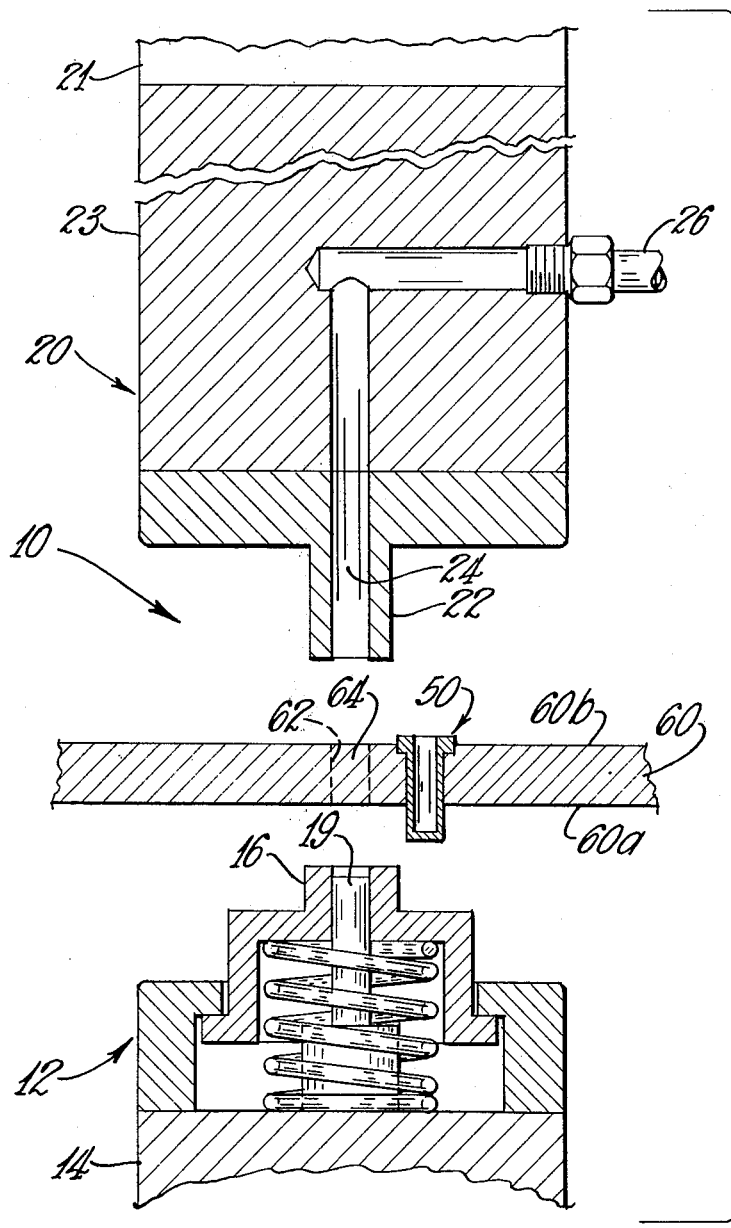
FIG. 2 is an enlarged section view in elevation of the aperture forming station shown in FIG. 1.

As seen in FIGS. 1 and 2 at the punch station 10 after the plate 60 is in position the punch assembly 12 and punch die assembly 20 cooperate to form aperture 62 (in phantom in FIG. 2) in the plate 60. In doing so the punch assembly 12 and punch die assembly 20 are moved along the same vertical axis toward each other by a toggle actuate punch ram 14 and punch die ram 21 respectively. Simultaneously, as die 22 contacts plate top 60 to provide support for plate 60, punch 14 punches a portion of plate 60, that is slug 64 (shown in phantom in the plate 60 in FIG. 2), from plate bottom 60a toward plate top 60b and finally into passageway 24 in die 22. Whereupon slug 64 will be deposited in slug receiver 25 through flexible hose 26 connecting passageway 24 running through die 22 and die head 23 with slug receiver 25 which is connected to a suitable vacuum source 27. Thus the slug receiver 25 operates like a vacuum cleaner to remove the slug 64 from the punch die assembly 10. With each aperture 62 punched there would be a cumulative tendency to permanently bow plate 60, if the plate immediately adjacent aperture 62 was not "worked" (e.g. depressed) according to the principles of the invention at the side opposite of the initiation of the punching.

Similarly, the punch die assembly 20 and the punch assembly 12 retract along the same axis, except that a spring loaded stripper guide 16 remains in contact with plate bottom 60a at least until the punch 14 is fully withdrawn from aperture 62 to provide support for plate 60 so as to reduce the tendency of the plate 60 to be pulled downward as the punch 14 is withdrawn. Such support is particularly advantageous here since no lubricants are being used at the punch 14 and plate 60 interface. This allows the plate 60 with the desired number of eyelets 50 in place to be welded without any cleaning operation between insertion and welding. Any significant residue of lubricant at the interface between eyelet 50 and plate 60 would act as a contaminant and detrimentally affect the integrity of the weld between the eyelet 50 and plate 60.

Figure 3:
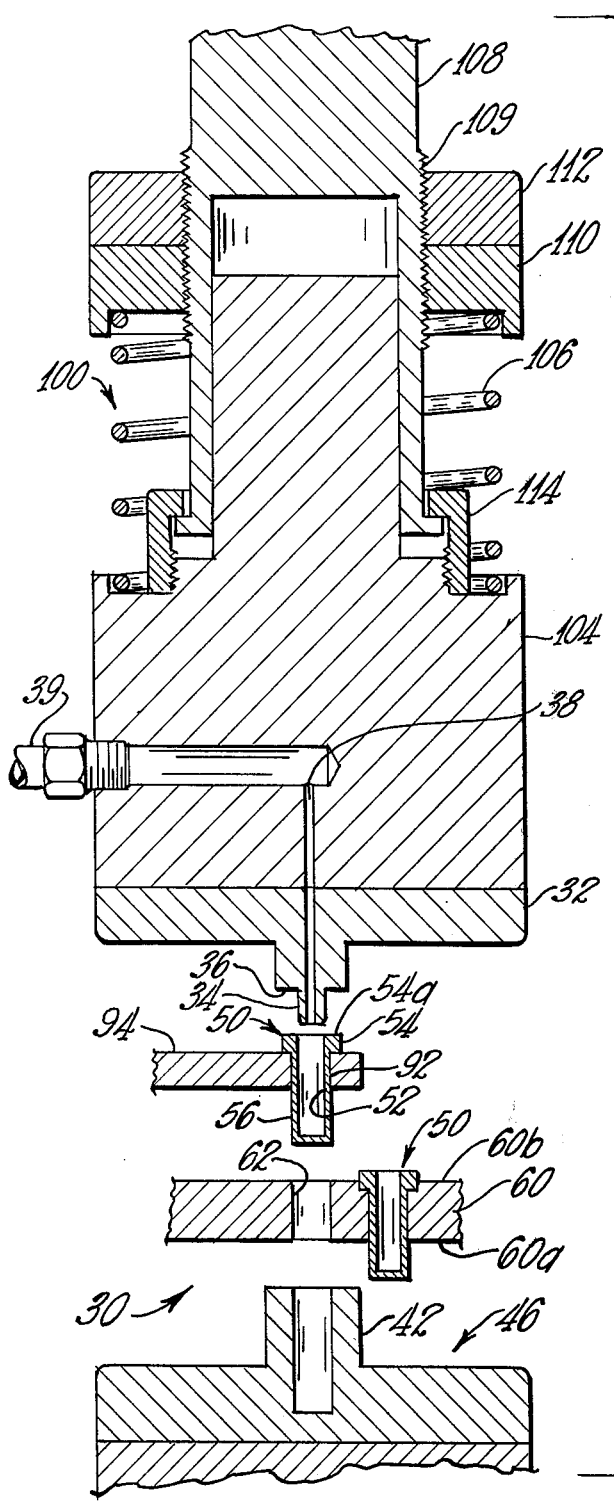
FIG. 3 is an enlarged section view in elevation of the member insertion station showing an eyelet in the feeding means about to be transferred to the eyelet insertion assembly.
Figure 4:
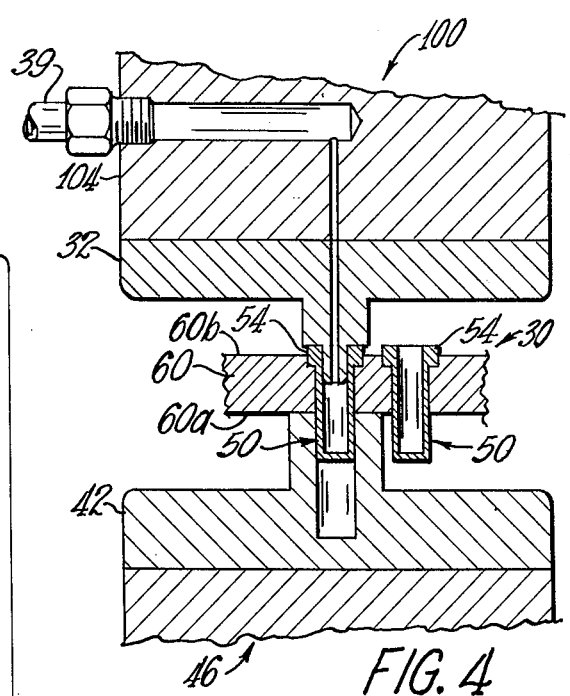
FIG. 4 is an enlarged section view in elevation of the eyelet insertion station of FIG. 1 showing the eyelet being pressed into the plate according to the principles of the invention.
Figure 6:
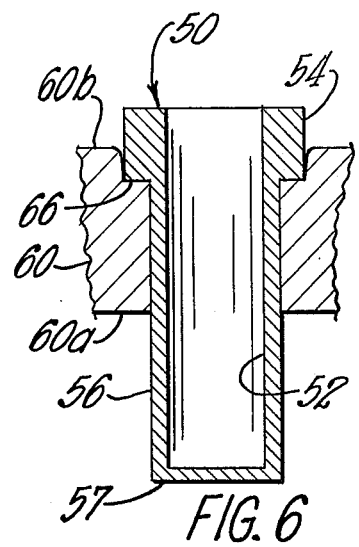
FIG. 6 is an enlarged section view in elevation of the eyelet pressed into the plate illstrating the depression of the plate immediately adjacent to the aperture in the plate under the flanged section of the eyelet according to the principles of the invention.

Once the punch assembly 12 and punch die assembly 20 have fully retracted the uniaxial traversing means 80 causes plate 60 through arm 78 and fixture 70 to be moved so that the recently formed aperture 62 is coaxially aligned with the eyelet insertion station 30, as in FIGS. 3 and 4.

Each eyelet 50 is delivered by a suitable vibratory feeder 90 to the receptacle 92 in delivery arm 94 (see FIGS. 1 and 3) which moves horizontally outward from the vibratory feeder 90 to a position such that the eyelet 50 is coaxial with the eyelet insertion station 30; and can be seen in FIGS. 1 and 3. Then the delivery arm is moved vertically by suitable means such as an air cylinder and/or cam and follower arrangement (not shown) so that eyelet 50 will be transferred to the insertion head 32. The eyelet 50 is held in position on the insertion head 32 after the delivery arm retracts by means of the guide pin 34, shoulder 36, and the pressure differential (i.e., suction) created across eyelet 50 by means of passageway 38 which is connected to a suitable vacuum source 40 by means of vacuum hose 39.

Guide pin 34 engages the interior wall 52 of eyelet 50 to keep eyelet 50 axially aligned. Shoulder 36 contacts upper surface 54a of flange 54 which defines the vertical position of the eyelet 50 on the insertion head 32 as well as providing the contact area through which the insertion head 32 will force the eyelet 50 into aperture 62 and plate 60.

As can be seen in FIGS. 3 and 4 eyelet 50 will be inserted into aperture 62 and force pressed downwardly into plate 60 in a direction from the plate top 60b toward the plate bottom 60a, that is, in the opposite direction of the punching operation according to the principles of the invention which will be set forth more fully below. As the eyelet 50 is being inserted the shift 56 of eyelet 50 will emerge from the plate 60 and slidably move into the insertion die 42 which acts as a guide for eyelet 50 and as support for plate 60 to facilitate maintaining proper orientation of eyelet 50 with respect to plate 60 during the insertion process. Similar to the aperture forming operation the insertion assembly 100 and insertion die assembly 46 are moved along the same vertical axis by the toggle actuated insertion ram 102 and insertion die ram 48 respectively (see FIG. 1).

Figure 9:
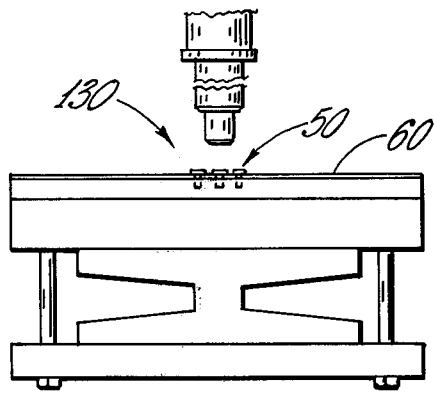
FIG. 9 is a front elevation of apparatus for welding the eyelet to the plate according to the principles of the invention.

After the insertion assembly 100 and insertion die assembly 46 have fully retracted, the uniaxial traversing means 80 and the N/C table 82 cooperate to transfer the plate 60 so that the next point at which an eyelet 50 is to be located is properly positioned at the punching station. Meanwhile another eyelet 50 is being transferred to the eyelet insertion assembly, and so on until the desired number of eyelets are in place. Then the eyelets 50 are welded to the plate 60 by any suitable means such as welding apparatus 130 which is described in Leedy et al. (U.S. Pat. No. 2,933,590) so that the plate 60 and each eyelet 50 are permanently and imperviously joined so as to prevent unwanted discharge of molten material (see FIG. 9).

Figure 5:
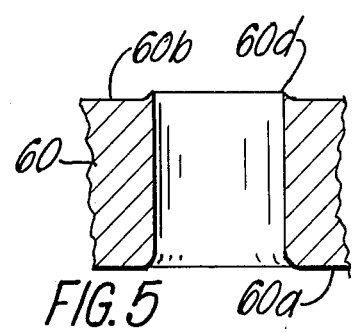
FIG. 5 is an enlarged section view in elevation of an aperture in the plate after punching but before the eyelet pressed into the plate illustrating the depression of tion of the plate immediately adjacent to the aperture due to the punching operation according to the principles of the invention.
Figure 7:
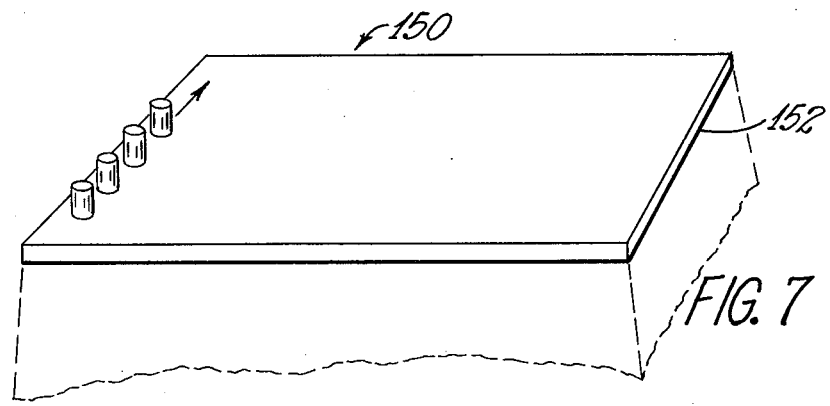
FIG. 7 is a perspective view of a bottom wall or feeder of a stream feeding container (inverted) fabricated according to the principles of the invention.

Due to each aperture punching operation certain nontransient stresses are induced in the plate 60, particularly in the section of the plate 60 immediately adjacent to the aperture 62. And it is well known the plate 60, if unrestrained, will bow to relieve those stresses. Generally, since each aperture 62 is punched from the plate bottom 60a to the plate top 60b, the stresses induced by each punch of an aperture will cumulatively tend to bow the plate 60 in the same direction. Also each punch generally effects sufficient movement of metal in the punching direction to form a raised portion 60d around the punched hole (see FIG. 5). The tendancy of the plate 60 to bow from each punch is essentially negated according to the invention by pressing the flange 54 of newly inserted eyelet 50 into the plate top 60b at the raised portion 60d during the pressing operation to such an extent that a depression 66 (similar to a counterbore) will form immediately adjacent to the aperture 62 at the plate top 60b before another aperture is punched. Such section of the plate 60 being deformed or depressed to the extent new nontransient counteracting stresses are created in the plate particularly in the section of the plate 60 immediately adjacent aperture 62 which essentially offset and/or cancel the stresses created in the plate 60 by the aperture punching operation, thereby effecting an essentially flat bottom wall 152 of a stream feeder 150, as in FIG. 7. In other words, the plate 60 is deformed proximately and/or contiguously with respect to the plate top 60b and/or surface 60c which defines 62 to such an extent that any tendency imparted to the plate 60 from the punching operation is effectively negated for each aperture 62 prior to forming another aperture 62. Or, sufficient metal immediately adjacent apertures 62 of the plate 60 is displaced in a direction from the other side towards the one side to negate the tendency of the plate 60 to bow from stresses in the plate 60 from punching.

For each bottom plate design the stresses created in the plate 60 by the punching operation may vary; due to, for example, plate thickness, material and size and geometry of the aperture. This, along with diverse characteristics for each eyelet design, may require that the force sufficient to deform the plate immediately adjacent to the aperture be varied so that an essentially flat bottom wall 152 results. Therefore the eyelet insertion assembly 100 incorporates: a floating head 104, spring 106, shaft 108, preload adjustment nut 110, lock nut 112, and retainer 114 to yield adjustable insertion force (see FIG. 3). In this case the force may be adjusted to between 300 and 1000 lbs for any particular bottom wall design, but the "insertion force setting" (i.e., preload) is generally not adjusted during the fabrication of any individual bottom wall 152. But rather the insertion force or preload is set or adjusted for the average insertion force required.

The insertion head 32 is fastened to floating head 104 which slidably engages shaft 108. The preload adjustment nut 110 engages a threaded section 109 of shaft 108, with spring 106 constrained between the preload adjustment nut 110 and the floating head 104. Retainer 114 is fastened to floating head 104 at one end and slidably interlocks with shaft 108 over a short distance to positively locate the relative position of floating head 104 when the insertion assembly 100 is in the retracted position. The preload adjustment nut 110 may be adjusted along the axis of shaft 108 by means of threads 109 to vary the amount of initial compression of spring 106, with lock nut 112 cooperating with shaft 108 and preload adjustment nut 110 to prevent the preload adjustment nut 110 from moving and thus changing the setting of the preload during operation.

The preload is the amount of force required to overcome spring 106 and force the floating head 104 slidably further into shaft 108. During operation shaft 108 will have a small amount of overtravel, which will be absorbed by the movement of the floating head 104 back into the shaft 108. Therefore the maximum force applied to the eyelet 50 during insertion, which determines the degree to which the flange 54 will be pressed into plate 60, will be equal to the preload plus the length of overtravel times the spring rate of spring 106, which should be approximately equal to the amount of preload since the length of overtravel will be small. The amount of overtravel, which is limited by the amount of travel permitted shaft 108 by retainer 114 and floating head 104, should be sufficient to insure complete and intimate surface contact between flange 54 and plate 60 by at least compensating for possible dimensional variations between eyelets 50 and sections of plate 60.

Because of the intended high cycle rate and the need for reliable maintenance free operation a suitable solid state logic control system (not shown) is used to control the sequencing of machine operations. In this case the sequence control utilizes Allen Bradley No. 1720 Cardlock system components to provide complete interlocking of all machine functions.

Figure 8:
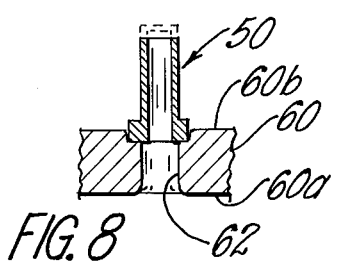
FIG. 8 is an enlarged section view in elevation of an alternative eyelet orientation with respect to the plate according to the principles of the invention.

FIG. 8 illustrates one of the alternative bottom wall designs where the eyelet 50 is not inserted in aperture 62, but rather is coaxially aligned with aperture 62 and disposed at the exterior of the plate top 60a. When in operation as a feeder, the flowable material would first pass through aperture 62 and then through eyelet 50.

Alternatively as another embodiment an essentially flat "tipless" feeder wall can be formed by punching an aperture from the plate bottom through the plate and then "working" the plate immediately adjacent the aperture at the plate top by means of a "pressing tool" at the second station. Since an eyelet is not used in this embodiment, such "tool" of suitable configuration would be used to depress the plate immediately adjacent the aperture at the plate top according to the principles of the invention as previously set forth and thereby effect an essentially flat orificed wall for a feeder.

Another embodiment within the scope of the invention would consist of sequentially punching each aperture from one side of the plate to the other, depressing the plate immediately adjacent to the aperture at the other side by means of a suitable tool according to the principles of the invention as previously set forth, and then inserting an eyelet in the aperture in the plate before proceeding with subsequent fabrication operations.

After the bottom wall 152 is completed, it then will be fabricated into a stream feeder 150 suitable for flowing streams of molten glass. (see FIG. 7). Whereupon these streams will be attenuated into filaments and gathered; all of which is well known in the art.

The eyelet 50 may be of any suitable compositon or configuration, but in the example set forth the eyelet 50 is basically platinum alloy of tubular configuration with a capped end 57, to allow for vacuum transfer to and selection by the insertion die assembly 46, a section of shaft 56, and a flange 54 opposite the capped end 57. And after eyelet 50 is fastened to plate 60, the capped end 57 is then machined, by any suitable means, to allow the passage of the flowable material through the eyelet 50.

It is apparent that, within the scope of the invention, modifications and different arrangements may be made other than as herein disclosed. The present disclosure is merely illustrative, the invention comprehending all variations thereof.

I claim:

1. The method of forming an orificed container for flowing streams of molten glass comprising:
    a. successively punching apertures through a plate with each of the apertures being punched through the plate from the same first side; and
    b. deforming the plate immediately adjacent each of the apparatus at the second side of the plate before punching succeeding apertures from the first side to such an extent that bowing of the plate otherwise occurring from the punching is essentially negated, thereby keeping the plate flat.

2. The method of claim 1 wherein the plate immediately adjacent to the aperture is essentially depressed at the second side toward the first side.

3. The method of claim 2 further comprising joining a member having a flanged section to the plate at each aperture wherein the flanged section is joined to the plate.

4. The method of claim 3 further comprising joining at least one wall to the orificed plate to contain the molten glass to be fed by the orificed container.

5. The method of forming an orificed container for flowing streams of molten glass comprising:
    a. punching apertures one at a time through a flat plate from the first side of the plate to form an orificed wall;
    b. inserting a member having a flanged section in each aperture such that the flanged section is disposed at the second side of the plate; and
    c. before punching succeeding apertures pressing the member toward the first side of the plate with enough force that the flanged section deforms the plate immediately adjacent to the aperture at the second side of the plate to such an extent that bowing of the plate otherwise occurring from the punching is essentially negated, thereby keeping the plate flat.

6. The method of claim 5 further comprising joining the member to the plate.

7. The method of claim 6 wherein the plate is joined to the member at the flanged section by welding, so as to prevent the unwanted discharge of the molten glass.

8. The method of claim 7 further comprising joining at least one wall to the orificed plate to contain the molten glass to be fed to the orificed container.

9. The method of forming an orificed container for flowing streams of molten glass comprising:
    a. punching an aperture through a flat plate from the first side of the plate;
    b. positioning an eyelet having a flanged section on a pressing tool;
    c. coaxially inserting the eyelet in the aperture such that the flanged section is disposed at the second side of the plate;
    d. pressing the eyelet toward the first side of the plate such that the flanged section nontransiently depresses the plate to form a counterbore immediately adjacent to the aperture at the second side of the plate to such an extent that bowing of the plate otherwise occurring from the punching is essentially negated, thereby keeping the plate flat;
    e. successively performing the above series of steps until the desired number of eyelets are pressed into the plate;
    f. then successively joining each eyelet at the flanged section to the plate by welding so as to prevent the unwanted discharge of molten glass; and
    g. then joining at least one wall to the orificed plate to contain the molten glass to be fed by the orificed container.

10. The method of claim 9 wherein each eyelet is welded to the plate by electric resistance welding.

11. The method of claim 9 wherein the eyelet is tubular having a circular flange perpendicular to the axis of the tube one end of the tube.

12. The method of claim 11 wherein the eyelet is maintained in position on the pressing tool by suction.

13. The method of forming an orificed container for flowing streams of flowable material comprising:
    a. forming an aperture through a plate from the first side to the second side; and
    b. before forming succeeding apertures nontransiently deforming the plate immediately adjacent to the aperture at the second side to such an extent bowing of the plate otherwise occurring from the aperture forming operation is essentially negated, and thereby maintain the shape of the plate prior to aperture formation.

14. The method of claim 13 wherein the aperture is formed by punching.

15. The method of forming an orificed container for flowing streams of molten glass from which glass filaments are attenuated comprising:
    a. punching successively apertures through a flat metal plate such that all of the apertures are punched from one side towards the other side, each punching effecting sufficient movement of metal in the punching direction to establish stresses in the plate tending to bow it; and b. before punching succeeding apertures displacing sufficient metal immediately adjacent the aperture of the plate in a direction from the other side towards the one side of negate the tendency of the plate to bow from stresses in the plate from punching.

16. The method of forming an orificed container for flowing streams of molten glass from which glass filaments are attenuated comprising:
 a. successively punching apertures through a flat metal plate such that all of the apertures are punched from one side towards the other side of the plate, each punching effecting sufficient movement of metal in the punching direction to establish stresses in the plate tending to bow it and to form a raised portion around each of the punched apertures; and
 b. before punching succeeding apertures engaging the raised portion to displace sufficient metal immediately adjacent each of the apertures of the plate in a direction from the other side towards the one side to negate the tendency of the plate to bow from stresses in the plate from punching.

17. The method of claim 16 including individually engaging the raised portions with the flange of a flanged member to displace the metal.

18. The method of claim 17 including moving the flanged member to effect a depression in the plate by the flange immediately adjacent the apertures.

* * * * *